US012776149B2

(12) United States Patent
Sugawara et al.

(10) Patent No.: US 12,776,149 B2
(45) Date of Patent: Oct. 27, 2026

(54) PREDICTIVE ROAD SURFACE IMAGE GENERATION SYSTEM BASED ON FUTURE DEGRADATION LEVELS

(71) Applicant: NEC Corporation, Tokyo (JP)

(72) Inventors: Chisato Sugawara, Tokyo (JP); Yuta Shimizu, Tokyo (JP); Yusuke Mizukoshi, Tokyo (JP); Toshimichi Yokote, Tokyo (JP); Yosuke Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 303 days.

(21) Appl. No.: 18/687,452

(22) PCT Filed: Sep. 14, 2021

(86) PCT No.: PCT/JP2021/033624
§ 371 (c)(1),
(2) Date: Feb. 28, 2024

(87) PCT Pub. No.: WO2023/042238
PCT Pub. Date: Mar. 23, 2023

(65) Prior Publication Data

US 2024/0378900 A1 Nov. 14, 2024

(51) Int. Cl.
*G06V 20/56* (2022.01)
*G06T 7/00* (2017.01)

(52) U.S. Cl.
CPC .......... *G06V 20/588* (2022.01); *G06T 7/0002* (2013.01); *G06T 2207/20081* (2013.01); *G06T 2207/20221* (2013.01)

(58) Field of Classification Search
CPC .... G06V 20/588; G06V 20/56; G06T 7/0002; G06T 2207/20081; G06T 2207/20221; G06T 1/00; G06T 7/00
See application file for complete search history.

(56) References Cited

U.S. PATENT DOCUMENTS

2017/0193338 A1* 7/2017 Huberman ............ G06V 20/56
2020/0257921 A1 8/2020 Viswanathan
(Continued)

FOREIGN PATENT DOCUMENTS

JP 2019-057192 A 4/2019
JP 2019-185443 A 10/2019
JP 2020-013537 A 1/2020
(Continued)

OTHER PUBLICATIONS

English Machine Translation of KR 102167292 B1 (Ryu, Published Oct. 20, 2020) (Year: 2020).*
(Continued)

*Primary Examiner* — Juan M Guillermety
(74) *Attorney, Agent, or Firm* — Sughrue Mion, PLLC

(57) ABSTRACT

An image generation system according to an aspect of the present disclosure includes: at least one memory configured to store instructions; and at least one processor configured to execute the instructions to: acquire a road image obtained by imaging of a road; determine a future degradation level of the road; and generate, based on the road image, a predictive image representing road degradation on a surface of the road, in accordance with the future degradation level.

16 Claims, 7 Drawing Sheets

(56) References Cited

U.S. PATENT DOCUMENTS

2022/0363287 A1* 11/2022 Twumasi-Boakye ........................ B60W 40/06
2023/0091376 A1* 3/2023 Jumonji ................. G06N 5/022 706/46

FOREIGN PATENT DOCUMENTS

JP 2020-147961 A 9/2020
WO P2020/022042 A1 1/2020

OTHER PUBLICATIONS

International Search Report for PCT Application No. PCT/JP2021/033624, mailed on Dec. 7, 2021.
English translation of Written opinion for PCT Application No. PCT/JP2021/033624, mailed on Dec. 7, 2021.

* cited by examiner

ROAD IMAGE

PREDICTIVE ROAD SURFACE IMAGE GENERATION SYSTEM BASED ON FUTURE DEGRADATION LEVELS

This application is a National Stage Entry of PCT/JP2021/033624 filed on Sep. 14, 2021, the contents of all of which are incorporated herein by reference, in their entirety.

TECHNICAL FIELD

The present disclosure relates to a road image generation system and the like.

BACKGROUND ART

A road deteriorates over time. The degradation level of the road is represented by numerical values such as a cracking rate, flatness, and a maintenance control index (MCI). The repair of the road is planned with reference to such numerical values and the past or current appearance of the road.

PTL 1 discloses a structure inspection support system that analyzes a degradation state of a structure and generates data of a prediction value of a future degradation level.

CITATION LIST

Patent Literature

PTL 1: JP 2019-057192 A

SUMMARY OF INVENTION

Technical Problem

When a future degradation level of a road is represented by a numerical value, it may be difficult to imagine a state of the road at that time point.

An object of the present disclosure is to provide an image generation system and the like that can easily express a future degradation level of a road.

Solution to Problem

An image generation system according to the present disclosure includes an acquisition means that acquires a road image obtained by imaging of a road, a degradation level determination means that determines a future degradation level of the road, and a generation means that generates, based on the road image, a predictive image representing, on the road, road degradation in accordance with the degradation level.

An image generation method according to the present disclosure includes acquiring a road image obtained by imaging a road, determining a future degradation level of the road, and generating, based on the road image, a predictive image representing road degradation relevant to the degradation level on the road.

program according to the present disclosure causes a computer to execute acquiring a road image obtained by imaging a road, determining a future degradation level of the road, and generating, based on the road image, a predictive image representing road degradation relevant to the degradation level on the road.

Advantageous Effects of Invention

According to the present disclosure, a future degradation level of a road can be represented in an easy-to-understand manner.

EXAMPLE EMBODIMENT

Figure 1:
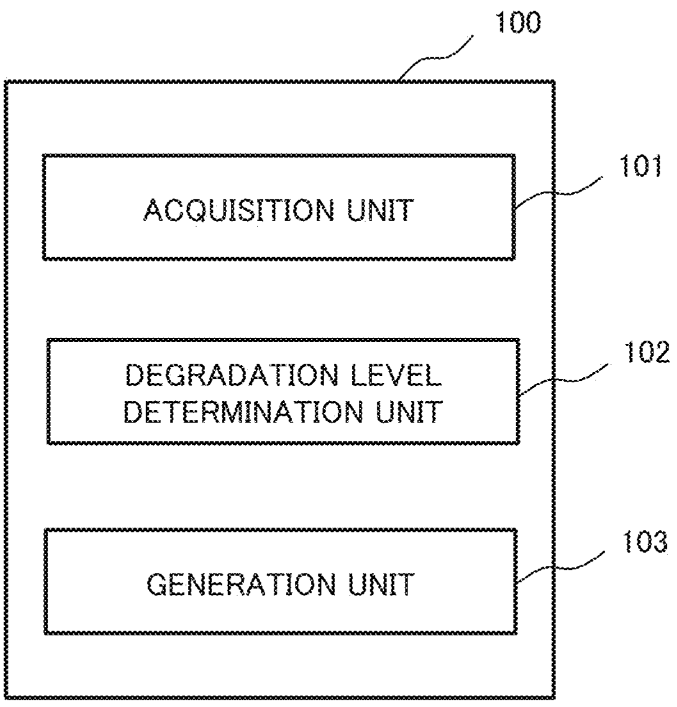
FIG. 1 is a block diagram illustrating a configuration example of an image generation system 100.

Prior to describing an example embodiment, an example of road degradation or the like in the present disclosure will be described.

The road degradation is degradation that occurs on a paved road due to factors such as traveling of a vehicle and rainfall. There are a plurality of types of road degradation. The road degradation is classified into a plurality of types including, for example, cracks, pot holes, rutting, and flatness abnormality of the road. Cracks may be classified into different types of straight cracks and tortoise-shell cracks depending on the shape. The straight crack is a single linear crack. The tortoise-shell crack is, for example, a tortoise-shell shaped crack generated when vertical and horizontal straight cracks are connected. Cracks in the road are progressed to straight cracks, tortoise-shell cracks, and pot holes.

Various indexes are used as indexes indicating the level of road degradation. In the present disclosure, the level of road degradation is represented by a degradation level. The degradation level may be any one of indexes including a level of cracking, the number of pot holes, a size of the pot hole, a rutting amount, or flatness. The degradation level may be determined based on a combination of a plurality of indexes indicating the level of road degradation.

The level of cracking is represented by any one of a shape, a length, an area, and the number of cracks, or a combination thereof. The cracking rate is an example of the level of cracking. The cracking rate is represented by, for example, 100× (crack area/road section area). In this case, the value of the degradation level ranges from 0% to 100%. The crack area is calculated by any method. A method of calculating the cracking rate is not particularly limited, and a known calculation method can be applied in addition to the above.

The size of the pot hole is represented by, for example, any one of an area, a width, a length, and a depth of the pot hole, or a combination thereof. The rutting amount is a depth of rutting at which a traveling track of the vehicle becomes lower than other road surfaces due to a load of the vehicle and friction with tires.

The level of cracking, the number and size of a pot hole, and the rutting amount may be calculated based on measurement data obtained by measuring a road surface with a sensor. Alternatively, these indexes may be calculated based on a recognition result of recognizing road degradation from an image obtained by imaging the road.

The flatness may be represented by an International Roughness Index (IRI). The IRI is an index in which the road surface and the ride comfort of the driver are associated with each other, and represents the level of unevenness as a numerical value. The IRI may be calculated based on measurement data obtained by measuring a road surface with a sensor. Alternatively, the IRI may be calculated based on a value of a running acceleration sensor attached to the vehicle. Specifically, for example, the IRI is calculated based on the value of the acceleration in the vertical direction included in the acceleration acquired at the detection position. The method of calculating the IRI is not limited to the above, and a known calculation method can be adopted.

The degradation level is not limited to the above-described index, and for example, any index representing road degradation including maintenance control index (MCI) may be used. The value of MCI is a minimum value of a result of calculating four definition equations using a cracking rate, a rutting amount, and flatness. The MCI decreases as the road degrades.

In the following description, a cracking rate is mainly used as the 25 degradation level. Therefore, when the degradation level deteriorates, the value of the degradation level increases. The manner of representing the degradation level is not limited to this, and for example, the value of the degradation level may be reduced when it deteriorates.

EXAMPLE EMBODIMENT

An image generation system according to an example embodiment generates a predictive image representing road degradation predicted to occur on a certain road in the future. The predictive image generated by the road image generation system represents the state of the road at a certain degradation level.

FIG. 1 is a block diagram illustrating a configuration example of an image generation system 100 according to an example embodiment. The image generation system 100 includes an acquisition unit 101, a degradation level determination unit 102, and a generation unit 103.

The acquisition unit 101 acquires a road image obtained by imaging a road. The road image may be captured by an in-vehicle camera such as a drive recorder. However, the type of the camera is not limited thereto, and various types of cameras may be used. For example, the road image may be captured by a camera mounted on another moving body such as a bicycle or a drone, a camera carried by a person, or a fixed camera installed on a road. The road image may be captured by a person or may be automatically captured.

The road image captured by the camera may be stored in a database (not illustrated). At this time, the acquisition unit 101 may acquire the road image from the database. Alternatively, in a case where the image generation system 100 is connected to any camera in a wired or wireless manner, the acquisition unit 101 may acquire the road image from the camera.

The acquisition unit 101 may acquire the date and time when the road image is photographed together with the road image. The acquisition unit 101 may acquire information of a position where the road image is photographed together with the road image. The positional information includes, for example, position information on a map, latitude and longitude, global navigation satellite system (GNSS), or global positioning system (GPS).

According to the road image acquired by the acquisition unit 101, the current or past state of the road is determined. The road image may or may not include road degradation such as cracking. The imaging range of the road image is not particularly limited, and the road image may include objects other than the road. When the image includes an object other than the road, the position or size of the road degradation may be easily known.

Furthermore, the acquisition unit 101 may acquire the material of the pavement of the captured road or the current degradation level of the road. For example, the acquisition unit 101 may recognize the material of the pavement and the current degradation level from the road image. The acquisition unit 101 may transmit the recognized material and degradation level to the degradation level determination unit 102.

The degradation level determination unit 102 determines a future degradation level of the road from which the road image is acquired. Specifically, the degradation level determination unit 102 determines the degradation level in the image generated by the generation unit 103. The degradation level determination unit 102 determines, for example, a cracking rate as the degradation level.

The degradation level determination unit 102 may determine the degradation level having received the input from the user as the future degradation level. The user inputs the degradation level using, for example, an input device connected to the image generation system 100. The input device is, for example, a mouse, a keyboard, or a touch panel display.

Alternatively, the degradation level determination unit 102 may determine the predicted degradation level as a future degradation level. For example, the degradation level determination unit 102 predicts the degradation level on the prediction target date. Any time point after the time point at which the road image is captured is set as the prediction target date. The prediction target date is set, for example, after the time point at which the degradation level determination unit 102 performs prediction, but is not limited thereto. The degradation level determination unit 102 may predict the degradation level on the prediction target date designated by the user.

The prediction of the degradation level may be performed by another device. The other device predicts the degradation level on the prediction target date, and transmits the degradation level to the image generation system 100. The degradation level determination unit 102 acquires the degradation level from the other device, and determines the predicted degradation level as a future degradation level.

As a method of predicting the degradation level, any method including a known method is used. An example of a prediction method will be described later.

The generation unit 103 generates, based on the road image, a predictive image representing road degradation relevant to the degradation level determined by the degradation level determination unit 102 on the captured road. When a predictive image representing future road degradation is presented on a captured road, a future state of the road is more likely to be imagined than when a degradation level is presented by a value. A method of generating an image will be described later.

The degradation level determination unit 102 may determine the degradation levels at a plurality of future time points. The generation unit 103 may generate a plurality of predictive images representing road degradation relevant to the degradation levels at a plurality of time points on the road. Specifically, for example, the degradation level determination unit 102 determines the degradation levels of the road 6 months, 12 months, and 18 months after the time point at which the road image is captured. At this time, the generation unit 103 generates three predictive images representing the degradation levels.

Figure 2:
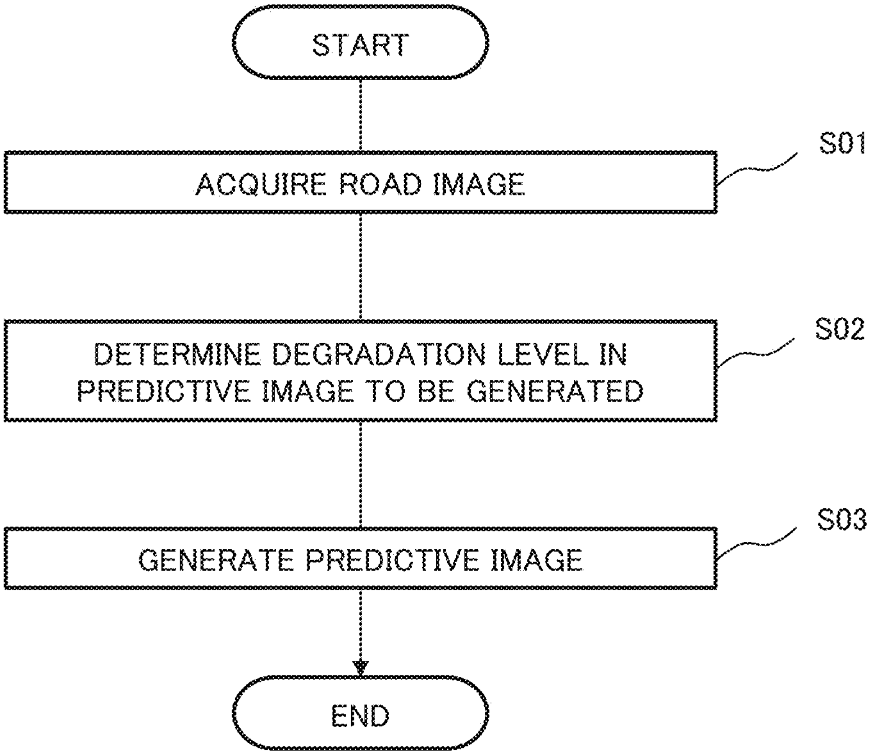
FIG. 2 is a flowchart illustrating an example of an operation of the image generation system 100.

FIG. 2 is a flowchart illustrating an example of an operation of the image generation system 100 according to an example embodiment.

Figure 3:
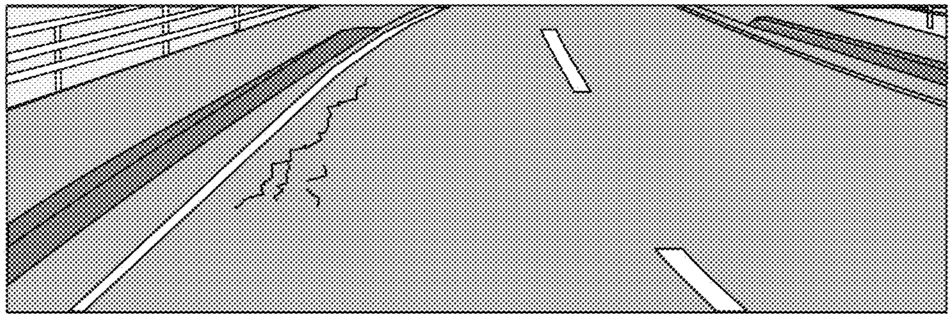
FIG. 3 is a diagram illustrating an example of a road image.

The acquisition unit 101 acquires a road image (step S01). The acquisition unit 101 may acquire the road image based on designation from the user. For example, the acquisition unit 101 may acquire a road image of a point designated by the user. FIG. 3 is a diagram illustrating an example of a road image. FIG. 3 is an image of a road on which a car runs. FIG. 3 is captured by, for example, a camera mounted on a vehicle running in a left lane. In this example, the camera captures an image of the front in the traveling direction. The road in FIG. 3 has a crack at the left end of the road. The road image in FIG. 3 includes sidewalks on both sides of the road. However, the imaging range of the road image is not limited to the range illustrated in FIG. 3. The imaging range may be narrow or wide in the longitudinal direction or the lateral direction, for example.

Figure 4:
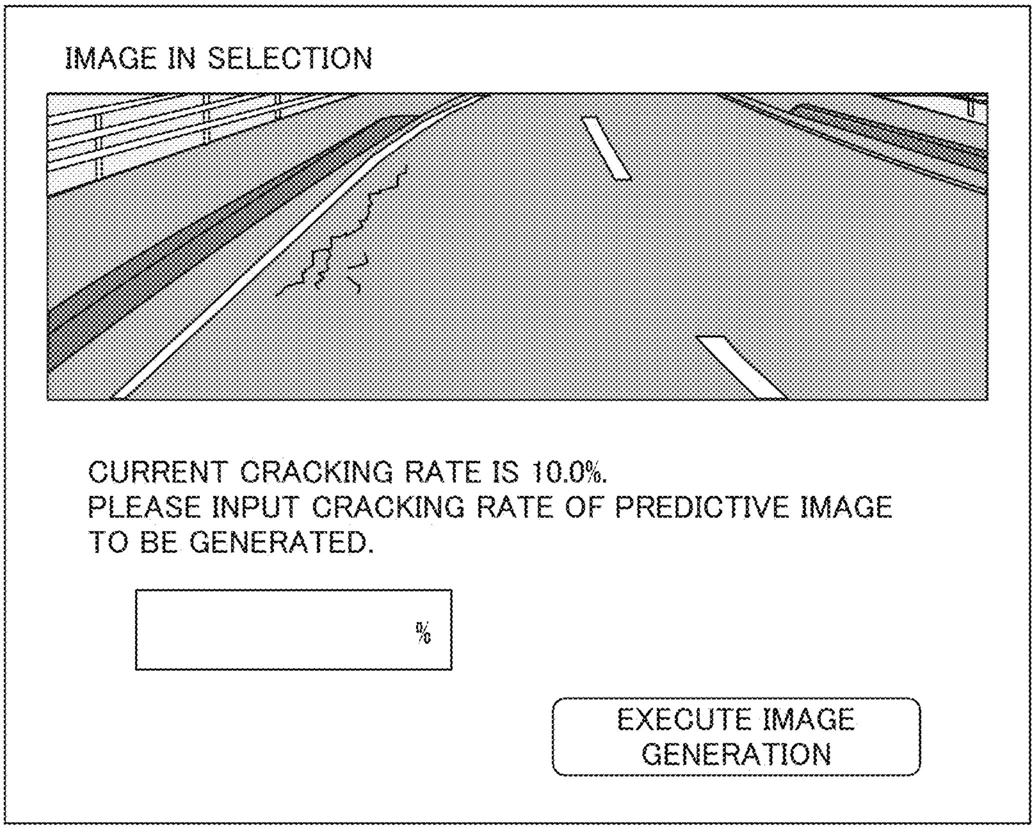
FIG. 4 is a diagram illustrating an example of a screen that receives an input of a degradation level.

The degradation level determination unit 102 determines a future degradation level (step S02). FIG. 4 is a diagram illustrating an example of a screen that receives an input of a degradation level from a user. The screen of FIG. 4 includes the acquired road image and the degradation level of the road image. For example, the user inputs a numerical value in an input field of a cracking rate. The method of inputting the degradation level is not limited to the input to the input field. The degradation level may be input using any of a pull-down list, a check box, or a radio button. When the user presses the "execute image generation" button, the degradation level determination unit 102 determines the received degradation level as the degradation level in the predictive image.

Figure 5:
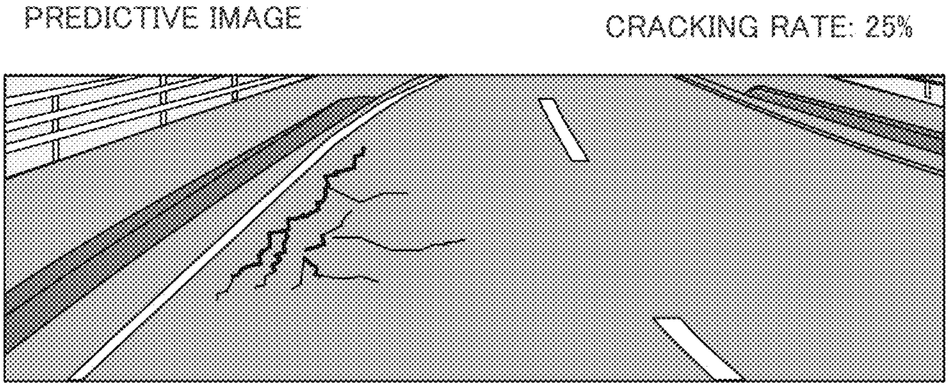
FIG. 5 is a diagram illustrating an example of a predictive image.

The generation unit 103 acquires the degradation level from the degradation level determination unit 102. Based on the acquired road image, the generation unit 103 generates a predictive image representing road degradation relevant to the determined degradation level on the captured road (step S03). FIG. 5 is a diagram illustrating an example of a predictive image to be generated. The predictive image of FIG. 5 has a larger number of cracks than the road image of FIG. 3. Some cracks are longer and thicker than road images.

(Prediction of Degradation Level)

An example of a method of predicting a future degradation level will be described. The degradation level determination unit 102 may predict the degradation level by any of the following methods. However, the prediction method is not limited to the following example. The prediction unit may predict the degradation level by combining a plurality of methods.

The degradation level determination unit 102 may predict the degradation level by giving a parameter related to the road to the prediction formula. The parameter related to the road is a parameter that affects the degradation level. The parameter related to the road represents a feature of the environment of the road or a feature of the road.

The degradation level determination unit 102 acquires a parameter related to a road for prediction. For example, the degradation level determination unit 102 may acquire a parameter input from the user. The degradation level determination unit 102 may acquire the parameter from the acquisition unit 101.

The parameters related to the road may be stored in the database for each road. The degradation level determination unit 102 acquires, for example, identification information of a road for which the degradation level is predicted. Next, the degradation level determination unit 102 acquires a parameter relevant to identification information of the road from the database. Alternatively, the parameter may be stored in association with the road image. In this case, the degradation level determination unit 102 acquires a parameter relevant to the road image.

Parameters related to roads are exemplified below. The parameters related to the road include parameters representing a feature of the environment of the road and parameters representing a feature of the road. The parameters representing the feature of the environment of the road include a traffic volume, weather information, and regional information. The parameter representing the feature of the road includes road construction information. The parameters are not limited thereto, and other parameters may be included.

The traffic volume is the amount of vehicles traveling on the road. Degradation of a road with a large traffic volume is fast. The traffic volume may include the amount of heavy vehicles traveling on the road. Degradation of a road on which many heavy vehicles travel is fast. The weather information is, for example, a precipitation amount, a snow accumulation amount, or a temperature. The regional information includes whether the region is a region where road degradation progresses rapidly. For example, in a region with a large amount of rainfall, a region close to a coast, or a cold region, road degradation progresses quickly.

The construction information is, for example, a material of a pavement, a state of a roadbed, a thickness of a layer, or a history of construction. The material of the pavement is, for example, asphalt and concrete. In general, asphalt deteriorates faster than concrete. The history of construction includes, for example, the time when the road is paved or the presence or absence of space construction. The degradation progresses with the lapse of time from the paved time. When space construction is performed, degradation progresses.

For example, the degradation level determination unit 102 may predict the future degradation level based on the traveling speed of road degradation. The traveling speed of road degradation indicates a change in the degradation level per unit time. The degradation level determination unit 102 calculates the future degradation level by giving the degradation level in the road image and the traveling speed of the road degradation to the prediction formula. The degradation level determination unit 102 may predict the degradation level in consideration of a change in the traveling speed per unit time.

The degradation level determination unit 102 may predict the degradation level in consideration of the fact that the traveling speed of road degradation varies depending on the road. The traveling speed of road degradation may be determined based on a parameter related to the road. The traveling speed of road degradation for each road may be stored in a database. At this time, the degradation level determination unit 102 may acquire the traveling speed of the road to be predicted from the database. The traveling speed of road degradation may be set to the same speed uniformly for all the roads. The traveling speed of road degradation is included in an example of a parameter related to a road.

The degradation level determination unit 102 may calculate the traveling speed of the road for which the degradation level is predicted based on the degradation levels at a plurality of past time points. The degradation level determination unit 102 may acquire the past degradation level from the database. Alternatively, the degradation level determination unit 102 may acquire an image obtained by imaging a road in the past and detect the past degradation level from the acquired image. Specifically, the degradation level determination unit 102 detects, for example, a crack, a pot hole, or rutting of a road from a past image. The degradation level determination unit 102 detects the position of the crack, the shape of the crack (line, tortoise-shell), the length or area of the crack, the number of cracks, the position of the pot hole, the area of the pot hole, the number of pot holes, or the rutting amount. The degradation level determination unit 102 calculates a change amount of the degradation level from the detected past degradation level.

(Generation of Image)

A method of generating a predictive image by the generation unit 103 will be described. However, the generation method is not limited to the following.

The generation unit 103 may generate a predictive image by adding a figure representing road degradation to the road image of the determined degradation level. For example, the generation unit 103 first recognizes a road portion of the original road image. Then, the generation unit 103 superimposes a figure on a road portion of the road image. As a figure representing a crack, for example, a line is superimposed.

The generation unit 103 may generate the predictive image in consideration of the position of the road degradation portion of the original image. Specifically, for example, the generation unit 103 recognizes a crack portion. Next, the generation unit 103 increases a crack in the vicinity of the crack or extends the recognized crack. In this way, the generation unit 103 can generate a predictive image in which road degradation indicated by the original road image has progressed.

The generation unit 103 may generate a predictive image by further using an image related to another road separately from the road image. Here, since another image is stored in any database, it is referred to as a stored image. The stored image represents road degradation of a road having a predetermined degradation level. The database stores the stored image and the degradation level of the road in association with each other.

For example, the generation unit 103 generates a predictive image by combining the road image acquired by the acquisition unit 101 and the stored image relevant to the determined degradation level. The stored image relevant to the determined degradation level includes a stored image representing the same degradation level as the determined degradation level. However, the stored image relevant to the determined degradation level may include a stored image representing a degradation level within a predetermined range from the determined degradation level.

The stored image may be an image obtained by imaging another road. The imaging range of the stored image may be similar to that of the road image, or may be wider or narrower than the imaging range of the road image. For example, the imaging range of the stored image may be a portion of the road with road degradation.

A method of synthesizing the road image and the stored image is not particularly limited. For example, the generation unit 103 may superimpose the stored image on the road image. Alternatively, the generation unit 103 may superimpose a road degradation portion of the stored image on the road of the road image.

The generation unit 103 may generate a predictive image by inputting a road image to a learning model generated by machine learning. For example, a Generative Adversarial Network (GAN) may be used as the learning model. For example, Cycle-GAN or Pix2Pix may be used among the GANs. The stored image described above may be used to generate the learning model.

According to the above example embodiment, the acquisition unit 101 acquires a road image obtained by imaging a road. The degradation level determination unit 102 determines a future degradation level of the road from which the road image has been acquired. Furthermore, the generation unit 103 generates a predictive image based on the road image. The predictive image represents road degradation relevant to the degradation level determined by the degradation level determination unit 102 on the captured road. Therefore, according to an example embodiment, the future degradation level of the road can be represented in an easy-to-understand manner.

The generated predictive images may be utilized, for example, to determine a budget for road repairs. Even if the future degradation level is presented as a numerical value, it is difficult for some people to understand the necessity of repair. Therefore, by presenting the predictive image, the necessity of repair is understood, and the budget for repairs is appropriately set.

Modification (Display of Predictive Image)

The image generation system 100 may further include a display control unit that causes a display (not illustrated) to display a predictive image. The display is, for example, a display or a tablet connected to a computer. An example of a method of displaying a predictive image will be described below. However, the display method of the predictive image is not limited to the following.

The display control unit may display the predictive image and the road image side by side. The display control unit may display the determined degradation level together with the predictive image. The display control unit may display the time related to the predictive image together with the predictive image. The time related to the predictive image indicates a time predicted to be required for the progress of road degradation from the degradation level of the road image to the degradation level of the predictive image. The time related to the predictive image may be displayed in any format such as the date of the prediction target date and the number of days, months, or years from the photographing date of the road image to the prediction target date. The display control unit may display a map indicating a point relevant to the predictive image to be displayed together with the predictive image.

The display control unit may display road degradation actually present and predicted road degradation included in the predictive image to be displayed in a distinguishable manner. For example, the display control unit displays real road degradation and predicted road degradation in different colors.

The display control unit may display a plurality of predictive images for one point. The display control unit may display a plurality of predictive images on one screen so that the user can list the predictive images. Alternatively, the display control unit may switch the predictive images to display each predictive image one by one. According to such switching display, the progress of road degradation is indicated like a fast-forwarded video of one point.

Figure 6:
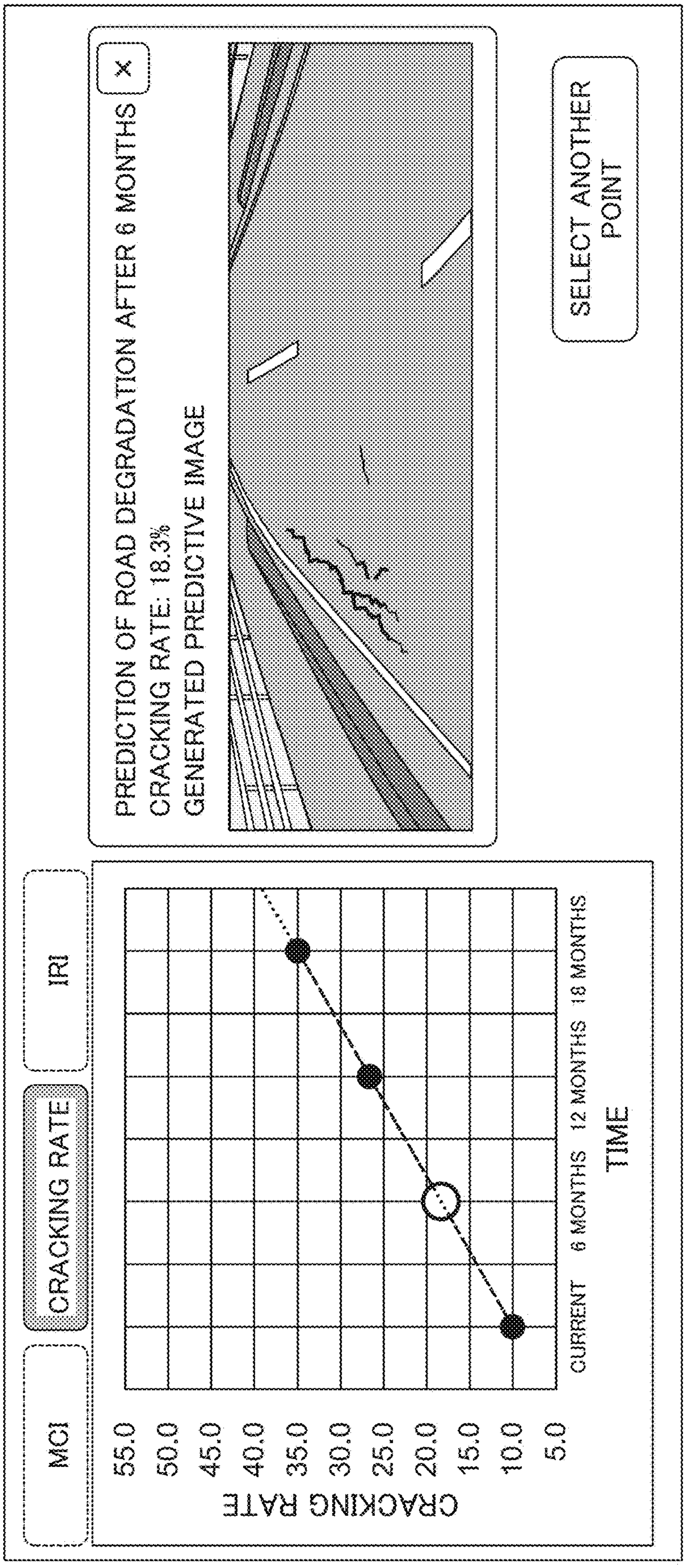
FIG. 6 is an image illustrating another example of a display screen of the predictive image.

The display control unit may display a graph indicating changes in time and degradation level in the captured road together with the predictive image. The generation unit 103 may generate a graph. For example, the generation unit 103 acquires and plots the degradation level for each time from the degradation level determination unit 102. The generation unit 103 passes the generated graph to the display control unit. FIG. 6 is an image illustrating another example of the predictive image display screen. FIG. 6 includes a graph illustrating a relationship between a cracking rate and time.

The display control unit may display the correspondence relationship between the predictive image to be displayed and the position in the graph. For example, a plot on a graph relevant to a predictive image to be displayed or a value on an axis may be displayed in a more emphasized manner than other plots or values.

On the screen of FIG. 6, a button of "MCI" or "IRI" may be pressed to display a graph relating to MCI and time and a graph relating to IRI and time.

The display control unit may switch and display predictive images for a plurality of points. The generation unit 103 may generate a predictive image for each of a plurality of road images obtained by capturing a plurality of consecutive points. At this time, for example, the display control unit may switch and display predictive images for a plurality of consecutive points. According to such a switching display, a state of traveling on a future road is indicated.

(User Interface)

The above-described display control unit may display a screen for receiving selection of a predictive image to be displayed among the plurality of generated predictive images. The display control unit may switch a predictive image to be displayed according to an input from the user.

For example, the display control unit may display a screen that receives an input of the prediction target date from the user. The prediction target date may be input in any format such as a date of the prediction target date, or the number of days, months, or years from the photographing date of the road image to the prediction target date. The display control unit displays the predictive image relevant to the input prediction target date.

Figure 7:
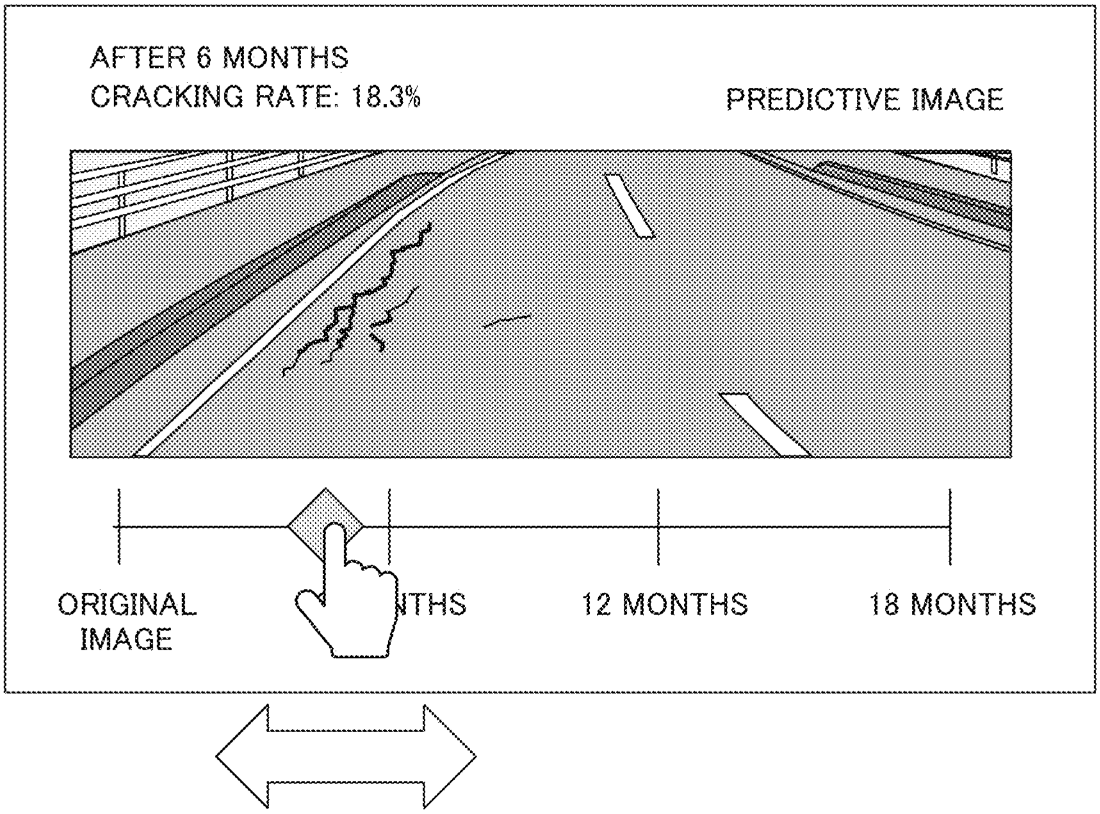
FIG. 7 is an image illustrating an example of a screen for receiving selection of a predictive image to be displayed.

FIG. 7 is an image illustrating an example of a screen for receiving selection of a predictive image to be displayed. According to the screen of FIG. 7, the user can select the prediction target date. The display control unit may display the slider bar and the slider, and switch the predictive image to be displayed based on the slide of the position of the slider on the bar.

Alternatively, similarly to the selection of the prediction target date, the display control unit may display a screen that receives the selection of the degradation level from the user. The display control unit displays the selected predictive image of the degradation level.

The display control unit may switch the predictive image based on clicking of a point on the graph of FIG. 6 or a value of an axis.

The display control unit may display a screen for accepting designation as to which road the predictive image is to be displayed. For example, the display control unit displays a map and displays a predictive image for the selected road.

(Determination of Type of Road Degradation)

The degradation level determination unit 102 may determine the type of road degradation represented in the predictive image. The degradation level determination unit 102 may determine the type of road degradation represented in the predictive image among the straight crack, the tortoise-shell crack, and the pot hole.

The degradation level determination unit 102 may determine the type of input received from the user as the type of road degradation represented in the predictive image. Alternatively, the degradation level determination unit 102 may determine the predicted type of road degradation as the type represented in the predictive image. The degradation level determination unit 102 may predict the type of road degradation that will occur on the road in the future. The degradation level determination unit 102 may determine the type of road degradation predicted by another device as the type represented in the predictive image.

The type of road degradation may be predicted in any manner. For example, the degradation level determination unit 102 may predict the type of road degradation based on the determined degradation level. Basically, the higher the degradation level, the more the type of road degradation that occurs on the road progresses to straight cracks, tortoise-shell cracks, and pot holes. Therefore, the degradation level determination unit 102 may predict that a pot hole and a tortoise-shell crack will occur when determining that the cracking rate is 70% or more, and predict that a tortoise-shell crack will occur when determining that the cracking rate is 50% or more.

Alternatively, the degradation level determination unit 102 may calculate the occurrence probability of each type of road degradation based on a parameter related to the road. For example, the probability of occurrence of a pot hole is high on a road with a large traffic volume and a large amount of precipitation. When the probability of occurrence of a pot hole is larger than a predetermined standard, the degradation level determination unit 102 predicts that a pot hole will occur.

The generation unit 103 may generate a predictive image representing the determined type of road degradation. For example, the generation unit 103 may draw the road degradation of the determined type on the road image. Alternatively, the generation unit 103 may combine the stored image relevant to the determined type of road degradation with the road image. At this time, the stored image can be stored in the database in association with the type of road degradation included in the image. The generation unit 103 may use a learning model that generates a predictive image including road degradation of the type of road degradation for which the road image is determined.

(Generation According to Material of Pavement)

The generation unit 103 may generate the predictive image based on the material of the pavement of the road included in the road image. The appearance of the road varies depending on the material of the pavement. How road degradation progresses may vary depending on the material of the pavement. Therefore, the stored image can be stored in the database in association with the degradation level of the road and the material of the pavement. The generation unit 103 receives, for example, a material of pavement of a road included in the road image from acquisition unit 101. The generation unit 103 may receive the input of the material of the pavement from the user. The generation unit 103 changes the stored image used to generate the predictive image according to the decided material of the pavement.

(Generation According to Weather)

The generation unit 103 may generate the predictive image according to the weather at the time of capturing the road image. The weather includes, for example, sunny, cloudy, and rainy. The appearance of the road varies depending on the weather. For example, in a cloudy day, the color of the road is darker than in a sunny day. On a rainy day, the road surface may be wet and form puddles. Therefore, for example, the generation unit 103 may generate the predictive image based on the stored image captured in the same weather as when the road image is captured.

The stored image can be stored in the database in association with the degradation level of the road and the weather at the time of capturing the stored image. The generation unit 103 acquires, for example, the weather at the time of capturing the road image from the acquisition unit 101. The acquisition unit 101 may acquire a result of analyzing the weather at the time of capturing the road image by analyzing the sky state or the road surface state indicated by the road image. Alternatively, the acquisition unit 101 may acquire the weather from a weather database based on the position and time at which the road image was captured. The generation unit 103 may receive an input of weather at the time of capturing the road image from the user.

[Hardware Configuration]

In the above-described example embodiment, each component of the image generation system 100 represents a block of functional units. A part or all of each component of each device may be achieved by any combination of the computer 500 and the program.

Figure 8:
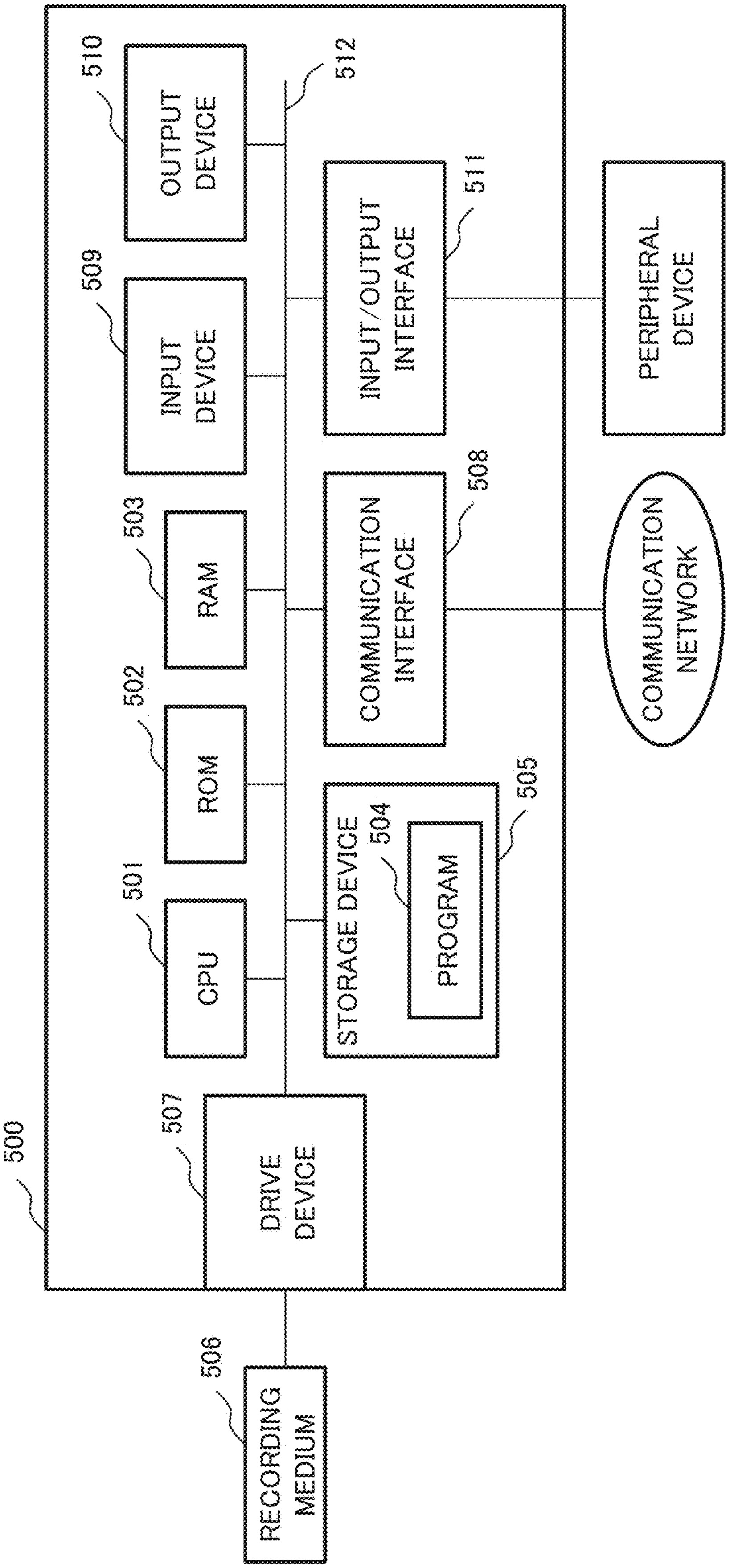
FIG. 8 is a block diagram illustrating an example of a hardware configuration of a computer 500.

FIG. 8 is a block diagram illustrating an exemplary hardware configuration of a computer 500. Referring to FIG. 8, the computer 500 includes, for example, a central processing unit (CPU) 501, a read only memory (ROM) 502, a random access memory (RAM) 503, a program 504, a storage device 505, a drive device 507, a communication interface 508, an input device 509, an input/output interface 511, and a bus 512.

The program 504 includes an instruction for achieving each function of each device. The program 504 is stored in advance in the ROM 502, the RAM 503, and the storage device 505. The CPU 501 achieves each function of each device by executing instructions included in the program 504. For example, the CPU 501 of the image generation system 100 executes instructions included in the program 504 to implement the functions of the image generation system 100. The RAM 503 may store data to be processed in each function of each device. For example, a road image, a stored image, or a predictive image may be stored in the RAM 503 of the computer 500.

The drive device 507 reads and writes a recording medium 506. The communication interface 508 provides an interface with a communication network. The input device 509 is, for example, a mouse, a keyboard, or the like, and receives an input of information from the user. The output device 510 is, for example, a display, and outputs (displays) information to the user. The input/output interface 511 provides an interface with a peripheral device. The bus 512 connects the components of the hardware. The program 504 may be supplied to the CPU 501 via the communication network, or may be stored in advance in the recording medium 506, and the drive device 507 may read the program and supply the program to the CPU 501.

The hardware configuration illustrated in FIG. 8 is an example, and other components may be added or some components may not be included.

There are various modifications of the method of achieving each device. For example, each device may be achieved by any combination of a computer and a program different for each component. A plurality of components included in each device may be achieved by any combination of one computer and a program.

Some or all of the components of each device may be achieved by general-purpose or dedicated circuitry including a processor or the like, or a combination thereof. These may be configured by a single chip or may be configured by a plurality of chips connected via a bus. Some or all of the components of each device may be achieved by a combination of the above-described circuit and the like and a program.

In a case where a part or all of each component of each device is achieved by a plurality of computers, circuits, and the like, the plurality of computers, circuits, and the like may be arranged in a centralized manner or in a distributed manner.

At least a part of the image generation system 100 may be provided in a software as a service (SaaS) format. That is, at least a part of the functions for realizing the image generation system 100 may be executed by software executed via a network.

Although the present disclosure has been particularly shown and described with reference to the present example embodiment, the present disclosure is not limited to the above example embodiment. It will be understood by those of ordinary skill in the art that various changes in form and details may be made therein without departing from the spirit and scope of the present disclosure as defined by the claims. The configurations in the example embodiments can be combined with each other without departing from the scope of the present disclosure.

Some or all of the above example embodiments may be described as the following Supplementary Notes, but are not limited to the following.

[Supplementary Note 1]

An image generation system including:

an acquisition means configured to acquire a road image obtained by imaging of a road;

a degradation level determination means configured to determine a future degradation level of the road; and a generation means configured to generate, based on the road image, a predictive image representing, on the road, road degradation in accordance with the degradation level.

[Supplementary Note 2]

The image generation system according to Supplementary Note 1, in which the predictive image is an image representing road degradation of at least one of cracks, pot holes, rutting, and flatness abnormality.

[Supplementary Note 3]

The image generation system according to Supplementary Note 1 or 2, in which the generation means generates the predictive image using a learning model.

[Supplementary Note 4]

The image generation system according to any one of Supplementary Notes 1 to 3, in which the generation means generates the predictive image by superimposing a figure representing road degradation on the road image.

[Supplementary Note 5]

The image generation system according to any one of Supplementary Notes 1 to 4, in which the generation means is configured to:

acquire a stored image representing road degradation of another road which is relevant to the determined degradation level; and generate the predictive image based on the acquired stored image and the acquired road image.

[Supplementary Note 6]

The image generation system according to any one of Supplementary Notes 1 to 5, in which the degradation level is an index indicating at least one of cracks, pot holes, rutting, and flatness abnormality.

[Supplementary Note 7]

The image generation system according to any one of Supplementary Notes 1 to 6, in which the degradation level determination means determines a type of road degradation represented in the predictive image, and the generation means generates the predictive image in which the road degradation of a determined type is represented in the predictive image.

[Supplementary Note 8]

The image generation system according to Supplementary Note 7, in which the degradation level determination means determines a type of road degradation represented in the predictive image among straight cracks, tortoise-shell cracks, and pot holes.

[Supplementary Note 9]

The image generation system according to any one of Supplementary Notes 1 to 8, in which the degradation level determination means determines a degradation level predicted based on a parameter related to the road as a future degradation level of the road.

[Supplementary Note 10]

The image generation system according to Supplementary Note 9, in which the degradation level determination means determines a degradation level predicted based on a traveling speed of road degradation as a future degradation level of the road.

[Supplementary Note 11]

The image generation system according to any one of Supplementary Notes 1 to 10, in which the degradation level determination means determines a degradation level at a time point designated by a user as a future degradation level of the road.

[Supplementary Note 12]

The image generation system according to any one of Supplementary Notes 1 to 8, in which the degradation level determination means determines a degradation level having received an input from a user as a future degradation level of the road.

[Supplementary Note 13]

The image generation system according to any one of Supplementary Notes 1 to 12, further including:

a display control means configured to display the predictive image.

[Supplementary Note 14]

The image generation system according to Supplementary Note 13, in which the display control means displays, together with the predictive image, one of the degradation level, a time predicted to be required for progress of road degradation from a degradation level of the road image to the degradation level of the predictive image, and the road image.

[Supplementary Note 15]

The image generation system according to Supplementary Note 13 or 14, in which the degradation level determination means determines the degradation levels at a plurality of future time points, the generation means generates a plurality of the predictive images in which road degradation relevant to the degradation levels at the plurality of time points is represented on the road, and the display control means displays a plurality of the predictive images.

[Supplementary Note 16]

The image generation system according to any one of Supplementary Notes 13 to 15, in which the generation means further generates a graph representing a relationship between time and the degradation level on the road, and the display control means displays the graph and displays a correspondence between the displayed predictive image and the graph.

[Supplementary Note 17]

The image generation system according to any one of Supplementary Notes 13 to 16, in which the display control means displays a screen for receiving selection of the predictive image to be displayed among a plurality of the predictive images.

[Supplementary Note 18]

The image generation system according to any one of Supplementary Notes 13 to 17, in which the display control means displays a map for receiving designation of the road on which the predictive image is to be displayed.

[Supplementary Note 19]

An image generation method including:

acquiring a road image obtained by imaging a road;

determining a future degradation level of the road; and generating, based on the road image, a predictive image representing road degradation relevant to the degradation level on the road.

[Supplementary Note 20]

A recording medium that non-transiently records a program for causing a computer to execute:

acquiring a road image obtained by imaging a road;

determining a future degradation level of the road; and generating, based on the road image, a predictive image representing road degradation relevant to the degradation level on the road.

REFERENCE SIGNS LIST

100 image generation system
101 acquisition unit
102 degradation level determination unit
103 generation unit

What is claimed is:

1. An image generation system comprising:

at least one memory configured to store instructions; and at least one processor configured to execute the instructions to:

acquire a road image obtained by imaging of a road;

analyze the road image to detect existing degradation features including at least one of cracks, potholes, and rutting on a road surface;

extract degradation parameters from the detected existing degradation features, the degradation parameters including at least one of crack length, cracking rate, pothole area, and rutting depth;

determine a future degradation level of the road, at a plurality of future time points, based on the extracted degradation parameters and road environmental parameters including at least one of traffic volume, precipitation amount, and pavement material;

generate, using a trained model based on the road image, a plurality of predictive images representing road degradation on a surface of the road, in accordance with the future degradation level;

receive, on a user interface, at least one selection parameter corresponding to the plurality of predictive images; and in response to the at least one selection parameter, update the user interface to display a predictive image of the plurality of predictive images corresponding to the at least one selection parameter.

2. The image generation system according to claim 1, wherein the plurality of predictive images represent road degradation of at least one of cracks, pot holes, rutting, and flatness abnormality.

3. The image generation system according to claim 1, wherein the at least one processor is further configured to execute the instructions to:

generate the plurality of predictive images by superimposing a figure representing road degradation on the road image.

4. The image generation system according to claim 1, wherein the at least one processor is further configured to execute the instructions to:

acquire a stored image representing road degradation of another road which is relevant to the determined future degradation level; and generate the plurality of predictive images based on the acquired stored image and the acquired road image.

5. The image generation system according to claim 1, wherein the at least one processor is further configured to execute the instructions to:

determine a type of road degradation represented in each predictive image of the plurality of predictive images, and generate each predictive image of the plurality of predictive images in which the road degradation of a determined type is represented in each of the plurality of predictive images.

6. The image generation system according to claim 5, wherein the at least one processor is further configured to execute the instructions to determine a type of road degradation represented in each of the plurality of predictive images among straight cracks, tortoise-shell cracks, and pot holes.

7. The image generation system according to claim 1, wherein the at least one processor is further configured to execute the instructions to:

determine a degradation level predicted based on a traveling speed of road degradation as a future degradation level of the road.

8. The image generation system according to claim 7, wherein the at least one processor is further configured to execute the instructions to:

generate a graph representing a relationship between time and the degradation level on the road, and display the graph and displays a correspondence relationship between the displayed predictive image and a position in the graph.

9. The image generation system according to claim 1, wherein the at least one processor is further configured to execute the instructions to:

determine a degradation level at a time point designated by a user as a future degradation level of the road.

10. The image generation system according to claim 1, wherein the at least one processor is further configured to execute the instructions to:

determine a degradation level having received an input from a user as a future degradation level of the road.

11. The image generation system according to claim 1, wherein the at least one processor is further configured to execute the instructions to:

display, together with the predictive image, one of the future degradation level, a time predicted to be required for progress of road degradation from a degradation level of the road image to the future degradation level of the predictive image, and the road image.

12. The image generation system according to claim 1, wherein the at least one processor is further configured to execute the instructions to:

display a map for receiving designation of the road on which the predictive image is to be displayed.

13. The image generation system according to claim 1, wherein the trained model is a Generative Adversarial Network (GAN).

14. The image generation system according to claim 1, wherein the at least one processor is further configured to:

display the predictive image with visual indicators distinguishing predicted degradation from existing degradation.

15. An image generation method comprising:

acquiring a road image obtained by imaging a road;

analyzing the road image to detect existing degradation features including at least one of cracks, potholes, and rutting on a road surface;

extracting degradation parameters from the detected existing degradation features, the degradation parameters including at least one of crack length, cracking rate, pothole area, and rutting depth;

determining a future degradation level of the road, at a plurality of future time points, based on the extracted degradation parameters and road environmental parameters including at least one of traffic volume, precipitation amount, and pavement material;

generating, using a trained model based on the road image, a plurality of predictive images representing road degradation on a surface of a road, in accordance with the future degradation level;

receiving, on a user interface, at least one selection parameter corresponding to the plurality of predictive images; and in response to the at least one selection parameter, updating the user interface to display a predictive image of the plurality of predictive images corresponding to the at least one selection parameter.

16. A recording medium that non-transiently records a program for causing a computer to execute:

acquiring a road image obtained by imaging a road;

analyzing the road image to detect existing degradation features including at least one of cracks, potholes, and rutting on a road surface;

extracting degradation parameters from the detected existing degradation features, the degradation parameters including at least one of crack length, cracking rate, pothole area, and rutting depth;

determining a future degradation level of the road, at a plurality of future time points, based on the extracted degradation parameters and road environmental parameters including at least one of traffic volume, precipitation amount, and pavement material;

generating, using a trained model based on the road image, a plurality of predictive images representing road degradation on a surface of a road, in accordance with the future degradation level;

receiving, on a user interface, at least one selection parameter corresponding to the plurality of predictive images; and in response to the at least one selection parameter, updating the user interface to display a predictive image of the plurality of predictive images corresponding to the at least one selection parameter.

* * * * *